April 9, 1957 P. ROBINSON 2,788,383
ELECTRICAL BATTERY
Filed Dec. 31, 1952 2 Sheets-Sheet 1
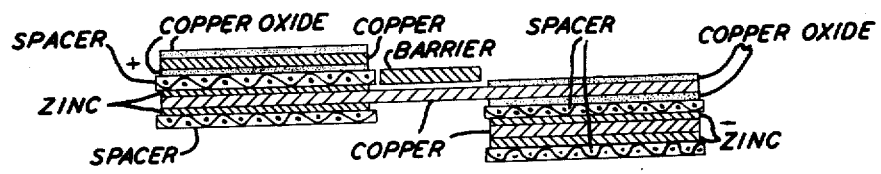
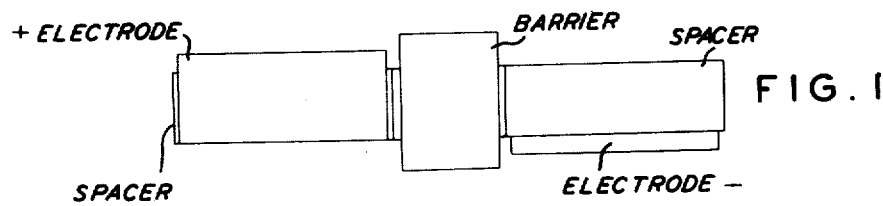
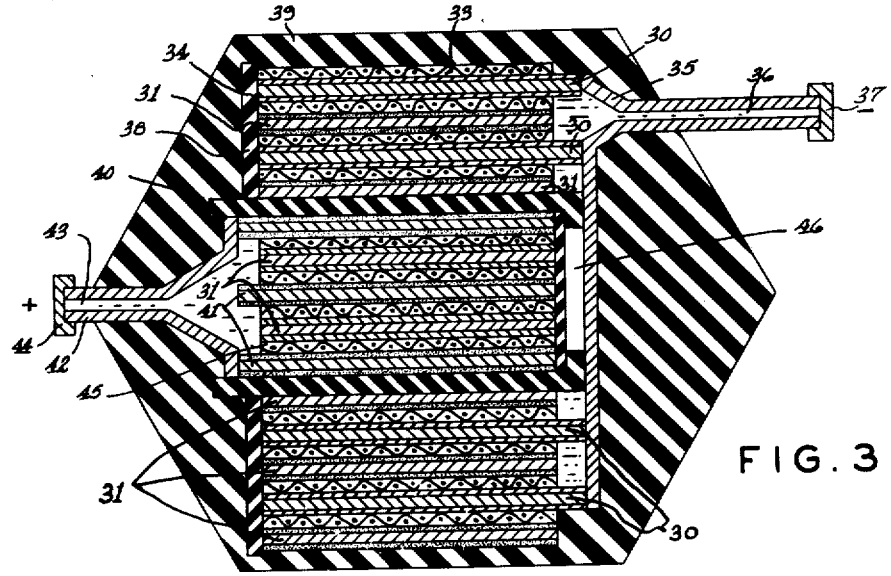
INVENTOR.
PRESTON ROBINSON
BY
HIS ATTORNEYS

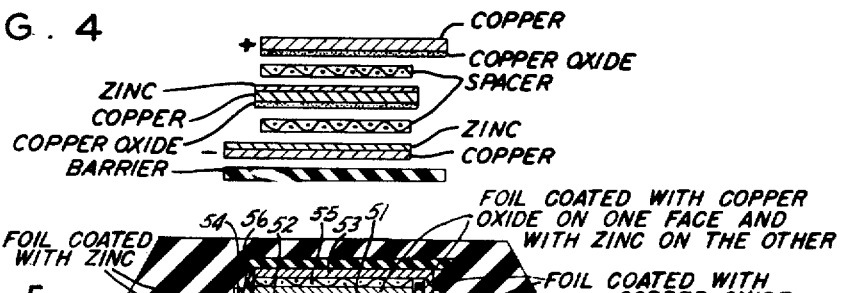
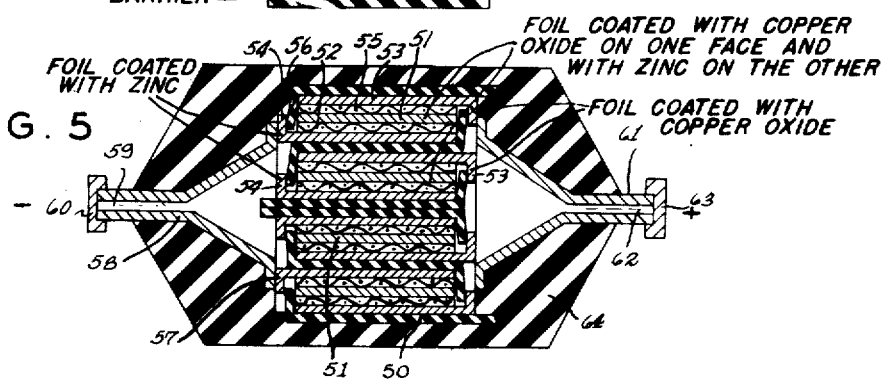
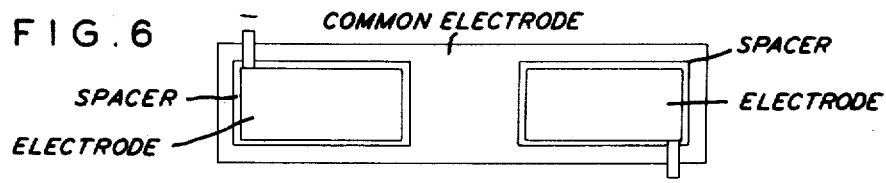
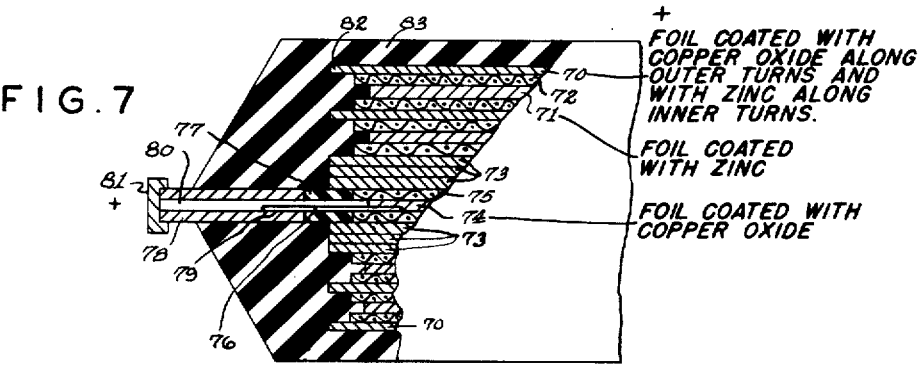

United States Patent Office 2,788,383
Patented Apr. 9, 1957

2,788,383
ELECTRICAL BATTERY

Preston Robinson, Williamstown, Mass., assignor to Sprague Electric Company, North Adams, Mass., a corporation of Massachusetts Application December 31, 1952, Serial No. 329,079

6 Claims. (Cl. 136—115)

This invention relates to improved primary cells and more specifically relates to alkaline copper oxide battery systems. This application is a continuation-in-part of application Serial No. 67,103, filed December 24, 1948, now abandoned.

The La Lande primary cell has been known for a great number of years and has been extensively used for railway signal and similar low voltage, high-drain applications. It has not been used in high voltage battery systems, because of the low voltage produced per cell, of the difficulty in sealing a number of wet (liquid electrolyte) cells in a single casing and for other reasons.

It is an object of the present invention to produce new alkaline batteries which are not subject to the above disadvantages. A further object is to produce new and inexpensive, high voltage primary cells. A still further object is to produce alkaline battery assemblies having a minimum volume. Additional objects will become apparent from the following description of the invention.

The invention is broadly concerned with novel physical structures for single and multi-element primary and secondary cells. These novel structures permit the fabrication of La Lande and other cell systems for use in applications to which such systems were previously more or less unsatisfactory. In its broad embodiments, the invention is based upon the discovery that an inert impervious copper conductor may be provided on one or both sides thereof with coatings of copper oxide and/or zinc and the coated product may be used to separate individual cells and electrolytes, as an inter-cell junction and for purposes and to advantage as later described.

The application of the coated copper sheet or foil, which will be referred to as the coated base, to certain novel structures made possible thereby, leads to several preferred embodiments of the invention, as described in succeeding paragraphs. The unitary anode-cathode electrode plates referred to herein may be produced by oxidizing one surface of a copper plate to cupric oxide, electroplating the opposite surface of said copper plate with zinc, and amalgamating the zinc layer.

Another embodiment of the invention is concerned with a rolled series battery which consists of a zinc coated copper anode foil and a cupric oxide coated copper cathode foil, with the anode and cathode foils being separated by at least one unterminated copper base foil on one surface of which is a zinc coating and on the other surface of which is a cupric oxide layer. The electrode foils are convolutely wound with alkaline electrolyte saturated spacing material and suitable barriers which separate the individual primary cells. This novel cell has an open circuit voltage of about (1.0+n) volts, where n is the number of unterminated (floating) base foils.

A further embodiment of the invention is concerned with a series cell which comprises an unterminated copper base foil, one portion of which is coated with zinc and another portion of which is coated with cupric oxide, convolutely wound with two smaller copper foils, one of which is coated with cupric oxide and registers on the zinc coated portion of the copper base foil and the other of which is zinc coated and registers on the cupric oxide coated portion of the copper base foil. The two smaller foils are electrochemically separated by an appropriate barrier. The O. C. V. of this cell is about 2.0 volts.

Another embodiment of the invention is concerned with novel series and/or parallel connected wound cells, whose structures are similar to those described in the last two paragraphs above but which contain at least two dissimilar cell systems. It is therefore possible to secure desirable temperature, voltage, current and other characteristics not previously approachable in a single cell structure.

The invention will be further described with reference to the appended drawing in which:

Figures 1, 2 and 3 show views of a rolled series cell of the invention,

Figures 4 and 5 show views of another rolled series cell of the invention,

Figures 6 and 7 show views of still another rolled series cell of the invention.

Referring now to Figures 1, 2 and 3, a series rolled primary cell is shown in various states of assembly. Figure 2 shows a cross-section of a laid out winding. One portion of the copper base foil element is coated with zinc, on both of its surfaces. Registering on this zinc coated portion is another copper foil, the flat sides of which are provided with a cupric oxide coating. The active elements are separated in the winding by spacers, which are saturated with or consist of electrolyte. The opposite portion of the central copper foil is provided with a cupric oxide coating and forms a primary cell with a smaller zinc coated copper element which registers upon this portion. Between the active portions of the winding, an inert impervious barrier, such as rubber, is provided.

The laid out winding is shown in top view in Figure 1. The most common winding employed (and shown in Figure 3) is to start the winding at the extremity adjacent to one active portion. However, the winding may be carried out with the two active portions starting together, e. g. one side of the winding will contain one primary cell and the other side the other, series-connected primary cell. In such cases, the barrier should be thicker in order to separate and electrically insulate the two sides of the winding. Thus, the barrier thickness must be at least as great as the total thickness of the cupric oxide and zinc layers, one of the smaller copper elements and the two spacers.

As shown in Figure 2, the smaller electrodes extend from opposite sides of the large, central foil, in order to provide terminating means.

Referring now to Figure 3, a cross-section of a complete series-connected battery is shown. The common electrode 31 is convolutely wound with inner electrode 41 and outer electrode 30. In the outer portion of the winding, the cupric oxide layers on electrode 30 by means of spacing material 33 and 34. One edge of foil 30 extends beyond one side of the winding and is press-fitted or welded to copper terminal 35. This terminal consists of a base plate which rests against the foil edge and an eyelet portion which extends beyond casing 39 and which is sealed by cap 37. The eyelet is provided in order that impregnation with electrolyte may be carried out after the molding or casing step. Electrolyte 36 fills the spacers 33 and 34 and freeboard within terminal 35. The opposite side of the winding is optionally provided with a washer 38, to prevent impregnation of the spacer with casing material.

The inner portion of the winding is separated from the outer portion by means of barrier 40, which is rolled in the winding for at least one complete turn. The edges of foil 41 extend from one side of the winding and the other side of the winding is provided with insulating disk 46, over the edges of which barrier 40 may be turned. Spacing material 45 separates the cupric oxide layers on the foil 41 and zinc layers on foil 31. Eyelet terminal element 42 is press-fitted or welded to the extended edges of foil 41 and sealed, after impregnation with electrolyte 43, by means of cap 44.

The entire winding is enclosed in insulating casing 39. The materials of construction will be described in later paragraphs.

Referring now to Figures 4 and 5, a unitary wound series battery is shown. Figure 4 shows an enlarged cross-sectional view of a single turn of the winding. A floating copper base element has a copper oxide coating on one foil surface and a zinc coating on the other foil surface. The former is separated by a spacer from a zinc coated terminal foil and the latter from a copper oxide coated terminal foil. A flexible, inert, impervious barrier separates the terminal foils from one another.

Referring to Figure 5, a cross-section of the wound battery is shown. The edges of zinc coated terminal foil 54 extends from one side of the winding and the edges of cupric oxide coated foil 53 extend from the other side of the winding. Floating active foil is separated from foil 53 and foil 54 by means of spacers 55 and 52, respectively. The edges of foil 51 extend slightly beyond the sides of the winding on each side, the extended edges of flexible barrier 50 are folded over on the edges of foil 51, in order to separate the individual cell systems. For example, barrier 50 is folded as shown at 56 and the edge 57 of foil 54, tightly pressed, folded or crimped over the barrier. Eyeletted copper terminal 58 is welded or press-fitted against the folded edges of foil 54. The eyelet opening of terminal 58 is sealed with cap 60 after impregnation with electrolyte 59. When necessary, one or two small holes may be drilled in the turned edge of foil 54 to permit rapid impregnation of spacer 52.

On the other side of the winding, the turned edge of foil 53 is welded or press-fitted to eyeletted terminal 61. After impregnation of spacer 55, with electrolyte 62, terminal 61 is sealed with cap 63. The entire wound assembly, with the exception of the terminal extremities and caps is sealed with an insulating casing 64.

Referring now to Figures 6 and 7, another series-wound battery is shown. A top view of the laid out winding is shown in Figure 6. It may be seen that the common electrode extends beyond all edges of both foils and the spacers. Terminal tabs are attached to each of the small foils.

A partial cross-section of the complete rolled battery is shown in Figure 7. 70 represents the common, unterminated electrode foil, the surfaces of which are provided with (a) a cupric oxide layer in one portion of the winding and (b) a zinc layer in the other portion of the winding, as illustrated in Figure 2. In the outer section of the winding foil 71 registers on coated electrode foil 71 and is separated therefrom by spacing material 72. The edge 82 of foil 70 extends beyond all other elements of the winding. Separating and sealing the two (inner and outer) portions of the winding, are several turns 73 of foil 70. The inner winding consists of active electrode foil 74, spacer material 75 and, again, foil 70. In this portion of the winding, foil 70 is provided with a coating of active material opposite to that with which it was coated in the outer portion of the winding. Copper terminal tab 76 is welded to terminal eyelet 78 at 79. The eyelet is generally a copper tube, the inner end of which is provided with tubular insulation 77, to insulate the terminal from foil 70. Impregnation of electrolyte 80 may take place through terminal eyelet 78. After impregnation, eyelet 78 is sealed with cap 81. The entire winding is enclosed in insulating casing 83 which fills in the space between the extended edges 82 of foil 70, thus further segregating the two cell sections.

It is also possible to produce parallel connected wound units, with the same or different electrochemical systems. Likewise, series connected and wound cells with different electrochemical systems from the Zn-CuO system described my be employed.

The use of a copper base element forms a preferred embodiment of the invention, since it is substantially inert in the system, since it has a high conductivity and since it may be fabricated in tough, thin foil form. It is generally preferable to employ pure rolled copper, since electroplated foil is sometimes porous. It is contemplated that other base metals may be employed. In certain cases, e. g. foil 30 of Figure 3, a solid zinc foil may be employed, but I prefer to use a zinc plated copper, because as the zinc is oxidized, the current path between terminal and zinc maintains its low resistance.

The spacer material may be a porous substance such as cotton, asbestos, paper, glass, etc. which may be impregnated with electrolyte, or a gelled solution of electrolyte, such as effected by use of carboxy methyl cellulose, hydroxy ethyl cellulose, starch, regenerated cellulose, polyvinyl alcohol, polyacrylic acid, ion-exchange resins, etc. Any of the above can be pre-impregnated with an electrolyte.

The electrolyte is usually a solution of KOH in water, perhaps modified with $Ca(OH)_2$ or other materials. Other electrolytes are, of course, useful in this system and the invention is by no means limited to $KOH-H_2O$ electrolytes.

The barrier material should be inert, non-porous and flexible. Suitable materials include natural and synthetic rubber and chlorinated synthetic rubbers; polyethylene, and polytetrahaloethylenes; polyacrylates, methacrylates, etc.; copolymers of vinyl acetate and vinyl chloride; polyvinyl chloride; linear condensation products of ethylene glycol and terepholic acid; polystyrene; polyamides; and polyurethanes. Likewise, the casing material should be resistant to the electrolyte non-porous and inert. It need not be flexible and may be applied by spraying, casting of partial polymers, heat and pressure molding, etc. The materials indicated above as barrier materials are satisfactory. Extremely small and advantageous rolls are formed using ¼ mil. resin film of the type indicated above. With such thin barriers metallized electrodes are best, as are pre-impregnated spacers.

While it is possible to mold impregnated windings in accordance with one of the limited embodiments of the invention, it is generally preferable to mold an unimpregnated rolled section. The water adsorbed by the spacer from the atmosphere appears to strengthen the structure for a heat and pressure molding operation, perhaps by forming steam which acts as a cushion.

When the units of this invention are to be encased in a molded resin casing it is frequently desirable to use a porous paper or similar spacer material containing from about 5 to about 15% water vapor, and to mold the casing while this moisture is present in the spacer. Subsequently, such water or moisture is removed from the so encased unit as by drying at an elevated temperature, say in the range of from 100 to 250° C. so as to leave a comparatively porous spacer construction which can be easily and completely impregnated with an electrolyte by conventional vacuum impregnating techniques. Batteries formed in this manner employing wound electrode and spacer constructions show high resistance to deformation during molding.

When the molding or casing method is applied to a construction which does not require subsequent impregnation, the terminal elements need not have eyelet openings.

Figures 1 through 7 have shown dual element batteries. However, the procedures and structures described in connection therewith are applicable to windings having more than two cell elements to produce higher voltage assemblies.

The windings described herein lead to cells having voltages greater than about 1 in a very small volume. At the same time, the flash current is very high and the batteries are effective even on high drains, because of the large effective surface area. The materials are inexpensive and the assembly labor is not great.

While the invention has been particularly described with reference to the use of cupric oxide as the oxidizing agent for the system, it is to be understood that other copper compounds which can be employed in primary and secondary cell systems are contemplated for use herein. For example, cuprous and cupric sulfide layers on the copper base electrode are useful. These sulfide layers are adherent and readily produced by reaction of certain sulfur compounds or sulfur itself with clean copper. In such instances, where other layers are employed, it is generally desirable to employ different electrolytes and the invention is not limited to $KOH-H_2O$ systems.

Likewise, it is to be understood that metals other than zinc can be employed as anode metals. Aluminum, magnesium, cadmium, nickel and other metals may be applied to the copper base foil.

As many apparently widely different embodiments of the invention may be made without departing from the spirit and scope thereof, it is to be understood that the invention is not limited to the specific embodiments hereof except as defined in the appended claims.

What is claimed is:

1. A battery having a plurality of generally tubular cells positioned one around the other in coaxial alignment, the cells including separate electrode strata convolutely wound with each other, one of the electrode strata extending from one cell to the next as a series connection, and a barrier convolutely wound with the series-connection electrode sealing the series-connected cells from each other.

2. A battery having a pair of generally tubular cells positioned one around the other in coaxial alignment, the cells including separate electrode strata convolutely wound with each other and with a porous spacing layer, one of the electrode strata extending from one cell to the next as a series connection, a barrier convolutely wound with the series-connection electrode sealing the series-connected cells from each other, and separate bodies of electrolyte impregnated in the spacing layers of the separate cells.

3. A battery having three ribbon-shaped electrodes convolutely wound together, one of said electrodes being bipolar and having separate portions sealed from each other and in independent coacting relationship with the separate other electrodes, and porous electrolyte-impregnated spaces separately wound between these other electrodes and the bipolar electrode.

4. The combination of claim 3 in which the electrodes and spacers all extend substantially the entire length of the winding, and the sealing is effected by a barrier ribbon also convolutely wound with the electrodes and spacers.

5. The combination of claim 3 in which the bipolar electrode extends substantially the entire length of the winding, the other electrodes extend only alongside the opposite ends of the bipolar electrode and are longitudinally spaced from each other, and the sealing is effected by a barrier convolutely wound with the electrodes in the space between the end electrodes.

6. The combination of claim 3 in which the bipolar electrode is a metal foil having a zinc electrode stratum and a copper oxide electrode stratum, these strata being in separate contact with the separate electrolyte portions, and the other electrodes being additional zinc and copper oxide strata in separate contact with the electrolyte portions that contact the respective copper oxide and zinc strata respectively of the bipolar electrode.

References Cited in the file of this patent
UNITED STATES PATENTS

| | | |
|---|---|---|
| 856,162 | Kitsee | June 4, 1907 |
| 1,548,539 | Martus et al. | Aug. 4, 1925 |
| 2,463,545 | Ruben | Mar. 8, 1949 |

UNITED STATES PATENT OFFICE

CERTIFICATE OF CORRECTION

Patent No. 2,788,383                                                               April 9, 1957

Preston Robinson

It is hereby certified that error appears in the printed specification of the above numbered patent requiring correction and that the said Letters Patent should read as corrected below.

Column 3, line 24, after "foil" insert -- 51 --; line 57, for "foil 71 and" read -- foil 70 and --; column 5, line 32, for "one" read -- with one extending completely --; lines 32 and 33, strike out "in coaxial alignment"; line 40, for "one around" read -- with one encircling --; same line 40, strike out "in coaxial alignment".

Signed and sealed this 20th day of August 1957.

(SEAL)
Attest:

KARL H. AXLINE
Attesting Officer

ROBERT C. WATSON
Commissioner of Patents